(No Model.)

W. LYON.
WOODWORKING MACHINE.

No. 506,919. Patented Oct. 17, 1893.

Witnesses

Inventor
William Lyon
by Benton J. Hall Atty.

UNITED STATES PATENT OFFICE.

WILLIAM LYON, OF BURLINGTON, IOWA.

WOODWORKING MACHINE.

SPECIFICATION forming part of Letters Patent No. 506,919, dated October 17, 1893.

Application filed June 2, 1893. Serial No. 476,331. (No model.)

*To all whom it may concern:*

Be it known that I, WILLIAM LYON, a citizen of the United States, residing at Burlington, in the county of Des Moines and State of Iowa, have invented new and useful Improvements in Woodworking Machines, of which the following is a specification.

My invention relates to improvements in wood-working machines of a novel and useful construction, and its object is to provide means for crowning joists, and edging or cutting one of the sides of joists or boards in a curved line, conforming as nearly as may be to the arc of a circle. I attain these objects by means of the mechanism illustrated in the accompanying drawings, in which like reference letters and numerals refer to like parts throughout.

Figure 1:
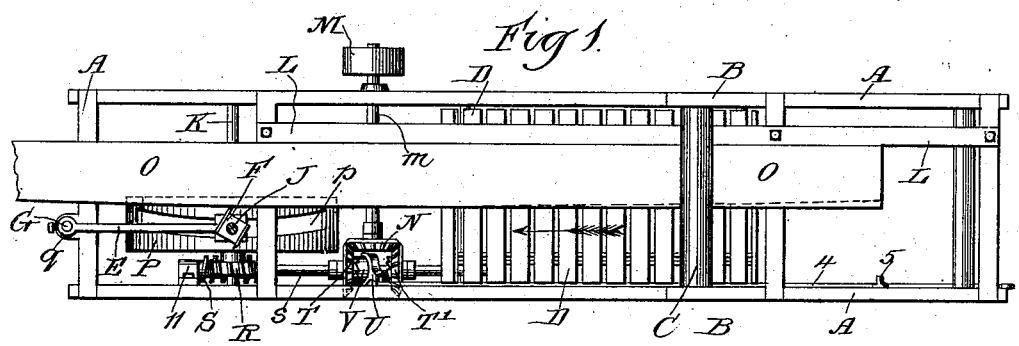
Figure 2:
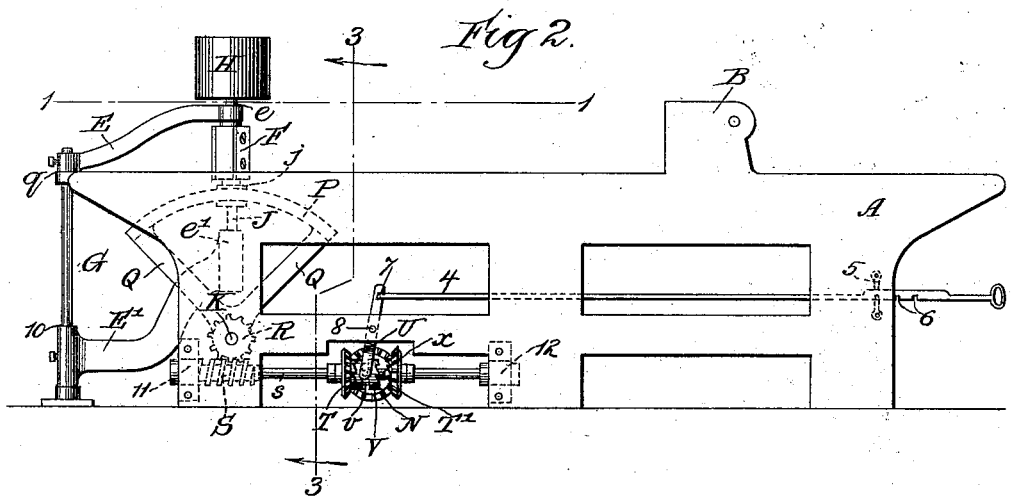
Figure 3:
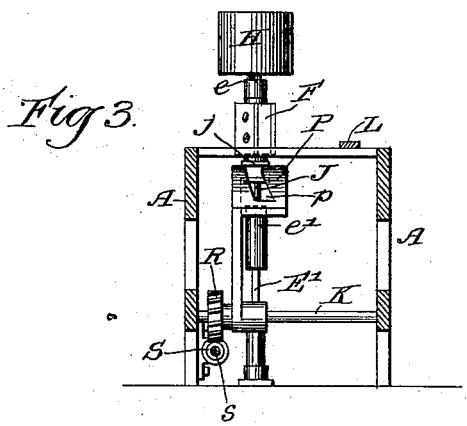
Figure 4:
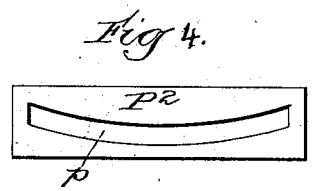

Figure 1 is a top plan view of my invention, upon the horizontal line 1—1, Fig. 2, with the pulley H removed. Fig. 2 is a side elevation of my invention. Fig. 3 is a cross-sectional view of my invention, upon the line 3—3, Fig. 2. Fig. 4 represents a detailed view of what I term the curved guide employed in my invention.

Letters A A A represent the ordinary frame work of a wood-working machine, such as in common use.

Letters B B represent projections from the frame work, supporting and carrying the presser-roll C.

Letter D represents the feed table, upon which the lumber to be crowned or dressed is carried forward to the cutter-heads. I have only illustrated in my drawings the top of this table or endless chain, for the reason that it is common to this class of machines, and is no part of the present invention.

Letters E E' represent brackets supported upon the frame of said machine, connected pivotally at 9 and 10 by bearings upon the upright G, which is rigidly attached to and supported by the frame work. These brackets support the shaft J, which carries the cutter-head F and the pulley H, supported by bearings at the points $e$ $e'$.

Letter H represents an ordinary pulley, by means of which, power is applied to the cutter-head F.

Letter P represents a portion of the periphery of the wheel in the shape of the segment of a circle, supported by the arms Q Q, supported by a bearing upon the shaft K as the center. This segment P may be a quadrant or a sextant of a circle, or any other portion thereof as required. The segment P constitutes a periphery or tire, and is provided with a curved slot $p$, of proper width to engage with the shaft J, or with the sleeve $j$ loosely located on the shaft J.

The arms Q. Q. are rigidly attached to the shaft K, which is provided, as shown in Figs. 2 and 3, with the worm gear R, capable of engaging with the worm-thread S. Supported in brackets 11 and 12 having bearings, is the shaft $s$, provided with the worm screw thread S, and having loosely located upon it, the two beveled gear wheels T T', capable of engaging with the clutch V.

N represents the beveled gearing, engaging with the gear wheels T T', rigidly supported upon the shaft $m$ and operated by the pulley M.

The clutch V is located upon the shaft $s$, between the beveled gear wheels T and T', and is capable of opposite engagement with said gear wheels respectively. It is provided with a circular groove $v$, in which engages the pivots of the bifurcated arm U, which is supported pivotally by the frame at the point 8, and is pivotally connected at the point 7, with the rod 4. The rod 4 extends to the rear end of the frame, and is provided with notches, which are capable of engaging with the pivot or catch 5. The clutch V is connected with the shaft $s$, by the feathered spline $x$ intermediate the beveled gear wheels T T'.

The operation of my invention is simple. It is evident from the description of the construction of the cutter-head F, and its supports, that it is capable of lateral motion. When the board O is introduced beneath the presser roll C and the feed table D, it is carried forward upon its straight side, in close contact with the straight guide L, which is rigidly attached to the frame work of the machine. Just as the front end of the board approaches the cutter head F, the operator throws the segment P to a proper point to enable the cutter head to make the deepest incision upon the edge of the board. This is done by operating the rod 4 which causes the clutch V to engage with either the bevel gearing T or T' as the case may be. The curved slot *p* in this position forces the cutter head F inward, in front of the board, to the required position, and as the board progresses forward, the segment P, operated by the worm thread S and the worm-gear R, moves forward changing the position of the cutter head, according to the segment of a circle. When the cutter-head F has reached the center of the slot *p*, it is then farthest remote from the curve to be cut in the joist or board, and from thence on the curved slot controlling its action, brings it back so as to make its incision in accord with the curve. This operation completes the crowning of a single joist. At this moment another board or joist may be introduced immediately following the one just crowned and by simply reversing the clutch, and making it engage with the opposite beveled gear T or T' as the case may be, the segment P reverses its action, and by means of the slot *p*, compels the cutter-head F to pass through the same lateral movement, and make the same curved incision in the board that it did before; and thus the operation may be repeated indefinitely.

It is evident that the segment P, being of any given section of a circle, may enable the cutter-head F to cut a curve of any desired radius, depending upon the length of the board or joist, the only requirement being the relation between the speed of movement of the segment P, and that of the board or joist through the machine. For instance, in crowning a thirty-foot joist the relative speed of the joist through the machine would have to be very much greater, compared with the speed of the segment P than if the joist or board were only eighteen or twenty feet in length. But this is regulated by the extent of the segment and its slot *p* employed, and by the size of the pulleys M, and means for operating the feed table D. For all usual joists or boards this matter may be regulated by the extent of the segment P, as controlled by the rod 4, by the operator; that is to say, for a joist or board of ordinary length, he can use a portion of the segment P, and for a longer board or joist, a larger portion thereof.

It is evident that there may be many modifications of my invention without departing from the spirit thereof. Its essential feature is what I may term the curved guide to control and determine the lateral movement of the cutter-head, with reference to the joist or board to be crowned or cut, and the character and extent of the curve or crowning depends upon the relative movement of the curved guide, and of the board or joist to be crowned. For instance, instead of having the segment P, supported upon the arms Q Q, and the shaft K, a sliding plate P'', may be employed to control the movement of the cutterhead. It is also evident, that my invention may be applied to planers which are used sometimes to crown joists, that pass through a wood-working machine and are planed upon their upper edges; thus, the planer, by means of one or two of the guides provided with curved slots, such as I employ, may be given vertical instead of lateral movement. Thus, as shown in Fig. 5, a guide provided with a curved slot by simple mechanism could be applied to the shaft of a planer causing it to rise and fall vertically, cutting from the top edge of the joist a curve corresponding to the curve of the guide, depending upon the relative speed of the guide and the joist, through the machine.

It is also evident that there may be many other changes and modifications in the construction and arrangement of the parts of my invention, without departing from its spirit, and I therefore do not limit myself to the exact construction and arrangement shown.

Having thus described my invention and its mode of operation, what I claim, and desire to secure by Letters Patent of the United States, is as follows:

1. In a wood-working machine the combination of a frame having a presser-roll, and a feed table, and means for operating the same; with a cutter-head capable of movement to and from the material to be cut or dressed; a curved guide P provided with a curved slot engaging with said cutter-head, and capable of controlling the said movement thereof; and means giving said curved guide a defined relative longitudinal movement, with reference to the forward movement of said feed table; whereby said cutter-head will incise and cut an arc of a predetermined radius, in one edge of a joist or other material passing through said machine; all substantially as shown.

2. In a wood-working machine the combination of a frame, having a presser roll and a feed table, and means for operating the same; with a cutter-head capable of lateral motion; a curved guide P provided with a curved slot engaging with said cutter-head and capable of controlling its said motion; and means for giving said curved guide a defined relative longitudinal motion, with reference to the forward movement of said feed table; whereby said cutter-head will incise and cut in one edge of the joist or other material, passing through said machine, an arc of predetermined radius; all substantially as shown.

3. In a wood-working machine the combination of a frame having a straight guide L, a presser roll and a feed table, and means for operating the same; with a cutter-head capable of lateral motion; a curved guide P provided with a curved slot capable of engaging with said cutter-head, and capable of controlling its said motion; and means for giving said curved guide a defined relative longitudinal motion with reference to the forward movement of said feed table; whereby said cutter-head will incise and cut in one edge of a joist or other material passing through said machine, an arc of predetermined radius; all substantially as shown.

4. In a wood-working machine the combination of a frame having means for feeding a joist or other material to be crowned or dressed through said machine at a given speed; with a cutter-head supported movably on said frame, and capable of lateral movement with reference thereto; a curved guide P provided with a slot $p$, in the periphery of its arc, engaging with the shaft of said cutter-head, and controlling the lateral movement thereof; said curved guide P supported rigidly upon the shaft K, and means for rocking said curved guide P back and forth upon said shaft, at a speed relative to the forward movement of the feeding mechanism; all substantially as shown.

5. In a wood-working machine, the combination of a cutter head, capable of lateral motion; a curved guide engaging with said cutter-head, and capable of controlling said lateral motion; said curved guide being connected with and controlled by a shaft K; a worm-gear R supported on said shaft K; a shaft $s$ supported by brackets attached to said machine; and provided with a worm screw thread engaging with said worm gear; and means for rotating said shaft $s$ in opposite directions, or bringing it to rest as may be desired; all substantially as shown.

6. In a wood-working machine, the combination of a general frame provided with a feeding mechanism; a cutter head supported in said frame, and capable of lateral movement in relation thereto; a curved guide P provided in its periphery with a curved slot capable of controlling the lateral motion of said cutter head; a shaft rigidly supporting said guide, and provided with a worm gear R; a shaft $s$ supported by bearings, connected with said frame and provided with a worm screw thread, engaging with said worm gearing; the beveled gearings T and T', loosely located on the shaft $s$; the beveled gear N engaging with said gears T T', and means for operating the same; the clutch V engaging with the shaft $s$ by a feathered spline; and means for operating said clutch so as to engage with either of said beveled gears T or T' and disengage from both; whereby said shaft may be rotated in opposite directions and said curved guide P may be rocked back and forth upon its shaft K, or be brought to rest; all substantially as shown.

7. In a woodworking machine the combination of a frame; a cutter head capable of lateral motion; a curved guide engaging with said cutter head, and capable of controlling its said motion; a shaft supporting said curved guide, and provided with a worm gear R; a shaft $s$ provided with a worm screw thread, engaging with said worm gear; the beveled gears T and T', loosely located on said shaft; the beveled gear N engaging with said beveled gears T T', and means for operating the same; the clutch V capable of engaging with gears T or T' respectively and held on the shaft $s$ by a feathered spline; the bifurcated bracket or bar U engaging with said clutch; and the rod 4, pivotally connected at 7, with said bracket or bar; whereby through the operation of said clutch and worm gear, the said curved guide may be rocked back and forth upon the shaft K to any given extent, or brought to rest at any position; all substantially as shown.

WILLIAM LYON.

Witnesses:
THOS. S. ARCHIBALD,
WM. C. STEINMETZ.